Dec. 2, 1930.  J. BETHENOD  1,783,557
COMPENSATING SYSTEM FOR AMPLIFIERS
Filed Jan. 9, 1926
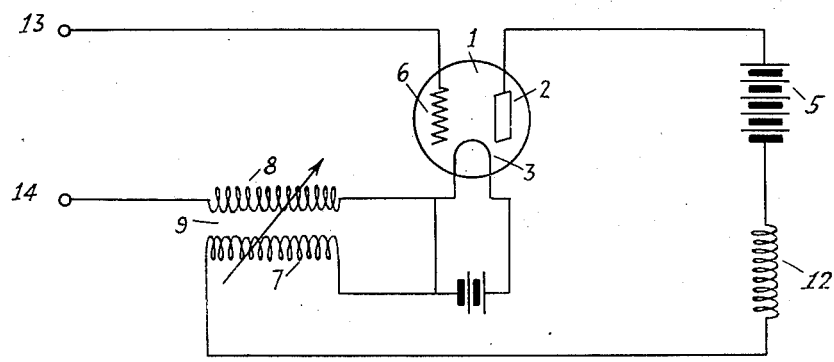
INVENTOR
JOSEPH BETHENOD
BY
ATTORNEY Patented Dec. 2, 1930

1,783,557

UNITED STATES PATENT OFFICE

JOSEPH BETHENOD, OF PARIS, FRANCE

COMPENSATING SYSTEM FOR AMPLIFIERS

Application filed January 9, 1926, Serial No. 80,140, and in France April 2, 1925.

The invention concerns an amplifying system and has for its principal object to provide for amplification without distortion.

Another object of the invention is to provide an amplifier of the three electrode vacuum tube type in which distortion in the output circuit is compensated for by applying to the input circuit the amount of energy necessary to compensate for the distortion in the output circuit.

Still another object of the invention is to provide an amplifying system making use of a three electrode vacuum tube in which distortion resulting from impedance in the output circuit is compensated by inductively connecting the output and input circuits to transfer to the latter an amount of energy necessary to compensate for the distortion.

In an amplifying system using a three electrode vacuum tube, if the plate current is used to energize an apparatus presenting an appreciable self inductance it is well known that the amplitude of the plate current will diminish when the frequency of a harmonic voltage applied to the grid filament circuit is increased, all things remaining the same otherwise. Furthermore, if the voltage applied to the input circuit undergoes non-harmonic variations, giving rise to transitory current conditions, the plate current will not be proportional to it at each instant and a very annoying distortion will result particularly in the case of a telephonic amplifier. I propose, according to the present invention, to avoid this distortion and obtain a plate current which shall be proportional to the input voltage at each instant by inductively connecting the plate circuit to the input circuit through a transformer and regulating the transformer so that sufficient energy will be fed from the output circuit to the input circuit to exactly compensate for the distortion arising in the anode circuit. In this manner a distortionless amplifier may be obtained.

The invention is shown by way of example in the accompanying drawing in which the single figure shows a diagrammatic circuit arrangement conforming to the invention.

Referring to the drawing, a vacuum tube amplifier is shown at 1 having a plate or anode 2, a cathode 3, energized by a suitable battery, and a grid 6. The voltage to be amplified is impressed across the grid and filament by means of the terminals 13 and 14. The plate or anode circuit includes a source of energy 5 for supplying the plate potential and an inductance 12 representing the apparatus which is to be energized by the amplified energy. The device 12 may be a telephone, loud speaker, or other device of which the self inductance is large enough to cause the effects noted above. As already explained the presence of this inductance gives rise to certain distortions in the amplifying action of the vacuum tube. These are corrected for by inserting the primary 7 of the transformer 9 in the output circuit and the secondary 8 thereof in the input circuit. This transformer may be either of the air core or iron core type and should preferably be adjustable to permit the amount of energy fed from the output to the input circuit to be regulated. If, now, a suitable value and sense for the coupling of the transformer coils is chosen the distortions arising from the presence of the inductance 12 will be compensated for by the energy fed to the input circuit across the transformer 9. The amplified current circulating in the apparatus 12 thus becomes proportional at each instant to the voltage applied to the input circuit of the tube. This can be proven mathematically as follows: Let M stand for the coefficient of coupling between 7 and 8; $\mu$, the amplification factor of the tube; R, the ohmic resistance of the plate circuit; $e$, the potential applied to the input (13—14); and K, a constant. Then $$\mu\left(e + KM\frac{di}{dt}\right) = Ri + L\frac{di}{dt}.$$

By adjusting M, $\mu$KM can be made equal to L, the inductance of 12. Therefore, $$\mu e + L\frac{di}{dt} = Ri + L\frac{di}{dt} \text{ and } \mu e = Ri.$$

While I have shown one particular modification of the invention by way of example, it will be obvious to those skilled in the art that it is capable of many variations. For example, in certain cases the primary 7 may be placed in parallel with the inductance 12 rather than in series therewith, the number of turns in this case being suitably chosen to allow for this connection.

I intend to be limited, therefore, only as indicated by the scope of the following claims:

1. A low frequency circuit arrangement for obtaining amplification without distortion, including a thermionic amplifier having input and output circuits, sound responsive means connected in the output circuit normally giving rise to distortion in said output circuit, the distortion being due to non-linear relation between output current and input voltage, and variable coupling means between the output and input circuits whereby sufficient energy is transferred to the latter circuit to accurately compensate for said distortion.

2. In a circuit arrangement for obtaining amplification without distortion, including a three-electrode vacuum tube having input and output circuits, sound responsive means of large impedance connected in the output circuit, normally causing the plate current to vary non-linearly with the input voltage, and a variable transformer coupling between the output and input circuits whereby the amount of energy fed from output to input circuits may be controlled to accurately compensate for distortion arising in the output circuit as a result of said non-linear variation.

3. An audio frequency amplifier comprising a vacuum tube having input and output circuits, an impedance in the output circuit normally giving rise to currents in said circuit that are not proportional to the applied input voltage, thereby causing distortion, a primary of a transformer in the output circuit, and a secondary of said transformer in the input circuit variably coupled thereto for feeding back to said input circuit sufficient energy to compensate for said distortion by causing the amplified current to become proportional at each instant to the applied input voltage.

4. A method of operating a low frequency amplifying circuit including an electron discharge tube having input and output circuits and an impedance in said output circuit normally giving rise to distortion therein, which consists in regeneratively coupling the output and input circuits, and feeding back output energy into the input circuit of such a magnitude and phase that said distortion is compensated for.

5. A method of operating an amplifier circuit including an electron discharge tube having input and output circuits and an impedance in the output circuit normally causing the output current to vary non-linearly with the input voltage, which consists in coupling the output and input circuits, and feeding back energy from the output to the input circuit in such proportions that distortion caused by said non-linear variation is compensated for.

6. A method of operating an amplifier circuit including an electron discharge tube having input and output circuits and an impedance in the output circuit normally causing the output current to vary non-linearly with the frequency of the input voltage, which consists in adjustably coupling the output circuit to a portion of the input circuit, and feeding back voltage from the output to the input circuit in such proportions that distortion caused by said non-linear variation is compensated for.

7. A method of operating an amplifier circuit including an electron discharge tube having input and output circuits and an impedance in the output circuit normally causing the output current to vary non-linearly with the frequency of the input voltage, which consists in inductively and adjustably coupling the output circuit to a portion of the input circuit and feeding back voltage from the output to the input circuit in such proportions that distortion caused by said non-linear variation is compensated for.

8. A method of operating an amplifier circuit including an electron discharge tube having input and output circuits and an impedance in the output circuit normally causing the output current to vary non-linearly with the frequency of the input voltage, which consists in coupling the output and input circuits, and feeding back voltage from the output to the input circuit of such a magnitude and phase that distortion caused by said non-linear variation is compensated for.

9. A method of operating an audio frequency amplifier circuit including an electron discharge tube having input and output circuits and an impedance in the output circuit normally causing the output current to vary non-linearly with the frequency of the input voltage, which consists in adjustably coupling the output and input circuits, and feeding back voltage from the output to the input circuit of such a magnitude and phase that distortion caused by said non-linear variation is compensated for.

JOSEPH BETHENOD.